United States Patent [19]

Hedges

[11] 4,382,223
[45] May 3, 1983

[54] VOLTAGE AND FREQUENCY-CONTROLLED AC WAVE MODIFIER

[75] Inventor: Rhey W. Hedges, Fort Lauderdale, Fla.

[73] Assignee: Louis W. Parker, Fort Lauderdale, Fla.

[21] Appl. No.: 43,594

[22] Filed: May 29, 1979

Related U.S. Application Data

[60] Division of Ser. No. 917,698, Jun. 21, 1978, Pat. No. 4,190,793, which is a continuation-in-part of Ser. No. 839,945, Oct. 6, 1977, abandoned.

[51] Int. Cl.³ .......................... G05F 1/455; H02P 7/36
[52] U.S. Cl. .................................... 323/242; 318/812; 323/244
[58] Field of Search ............... 307/252 B, 252 N; 323/225 C, 24, 34, 235, 237, 242, 243, 244, 245, 246, 319, 320; 318/799, 812

[56] References Cited

U.S. PATENT DOCUMENTS 3,243,689  3/1966  Perrins ........................ 323/242 X
3,320,518  5/1967  Weiss .............................. 323/245
3,590,365  6/1971  Nelson ............................ 323/245
3,836,839  9/1974  Becky .......................... 323/244 X

OTHER PUBLICATIONS

RCA Application Note ICAN-6158, May 1971, 12 Pages.

Primary Examiner—A. D. Pellinen
Attorney, Agent, or Firm—Pollock, Vande Sande & Priddy

[57] ABSTRACT

A standard, unmodified AC induction motor has its stator winding energized from a sine wave power source through a signal-responsive wave modifier operative to control the portion of each cycle of the sine wave which is coupled from said source to the stator winding. Load detecting means, comprising a comparatively small AC generator coupled to the rotor of the motor, produces a control signal, varying with variations in the load on the motor, for controlling the wave modifier to increase the field density of the stator winding with increases in load on the motor, and to decrease the field density of the stator winding with decreases in said load.

6 Claims, 3 Drawing Figures

VOLTAGE AND FREQUENCY-CONTROLLED AC WAVE MODIFIER

CROSS-REFERENCE TO RELATED APPLICATION

The present application is a division of application Ser. No. 917,698, filed June 21, 1978, now U.S. Pat. No. 4,190,793 which is a continuation-in-part of our prior copending application Ser. No. 839,945 filed Oct. 6, 1977 for *Energy Economizer for Induction Motors*.

BACKGROUND OF THE INVENTION

Conventional induction motors maintain the full sine wave of voltage across the stator winding regardless of the load in the motor. In those cases where the load varies within wide limits, e.g., when the motor is used for hoisting operations, most of the time the motor is not expending its full rated load. In such cases, the iron losses in the stator are substantially the same when the motor is operating below full rated load as is the case when the motor is operating at full rated load; and, due to the low power factor in such cases, the stator current is high and the copper losses are also substantial.

When a conventional induction motor is operating below its full rated load, a fraction of the sine wave of voltage would satisfy the actual load requirement imposed in the motor. Such cutting in part of the sine wave voltage would result in considerably less iron and copper losses and less heating of the stator. The resultant lower operating temperature further reduces the copper losses in the motor due to lowered ohmic resistance. These factors combine to effect a significant reduction in the energy which is consumed by the induction motor, with a consequent conservation in available energy sources and a reduction in motor operating costs.

The present invention is based upon a recognition of the foregoing factors, and provides a simple yet reliable mechanism operative to cause the electrical energy supplied to the stator and the stator flux density of a standard-unmodified-AC induction motor to become a function of its load demand at any given moment. The invention accomplishes this by permitting a greater or smaller portion of the sine wave of voltage from a power source to enter the stator as a function of the percentage of slip of the motor. In other words, the sine wave of the voltage supplied to the motor's stator is modified to suit existing load conditions. This results in the reduction of iron and copper losses.

SUMMARY OF THE INVENTION

In accordance with the present invention, a standard AC induction motor has its stator winding energized from a sine wave power source through wave modifier means operative to vary the portion of each cycle of said sine wave which is coupled from the source to the stator winding, under the control of a control signal which is provided by load detecting means coupled to the rotor of the motor and operating as part of a conditionally operative nonlinear closed loop positive feedback means to produce a control signal which varies with variations in the load on the motor at motor speeds above 95% of synchronous speed.

The load detecting means may comprise a comparatively small AC generator which is coupled to the motor rotor to produce an AC signal that is frequency modulated by variations in the load on the motor, and said frequency modulation is converted to amplitude variations of a DC control signal which controls the wave modifier means. Demodulation and conversion of modulated frequency variations to DC control signal variations may be accomplished by a frequency discriminator circuit whose output is coupled to a signal biased DC amplifier operative at a particular energy-efficient motor speed above 95% of synchronous speed, which functions to reduce the magnitude of the resultant DC control signal when the AC frequency of the generator increases (indicative of decreased motor slip), and which functions to increase the magnitude of the DC control signal when the AC frequency supplied by the generator decreases (indicative of increased motor slip).

The wave modifier preferably includes a normally inoperative pulse generator, such as a multivibrator, that is rendered operative to produce a train of pulses during all or a portion of each cycle from the sine wave energization source. The time duration during which the pulse generator is operative to produce output pulses is controlled by the aforementioned DC control signal and accordingly, it is dependent upon the load on and speed of the motor. The pulse train, when generated, controls the closure of a full wave solid state power switch, such as a Triac, disposed between the sine wave power source and the motor stator, so that the portion of each sine wave which is coupled to the motor stator, and accordingly the field density of the stator winding, varies with variations in the load on the motor.

BRIEF DESCRIPTION OF THE DRAWINGS

The foregoing objects, advantages, construction and operation of the present invention will become more readily apparent from the following description and accompanying drawings, wherein.

DESCRIPTION OF THE PREFERRED EMBODIMENTS

Figure 1:
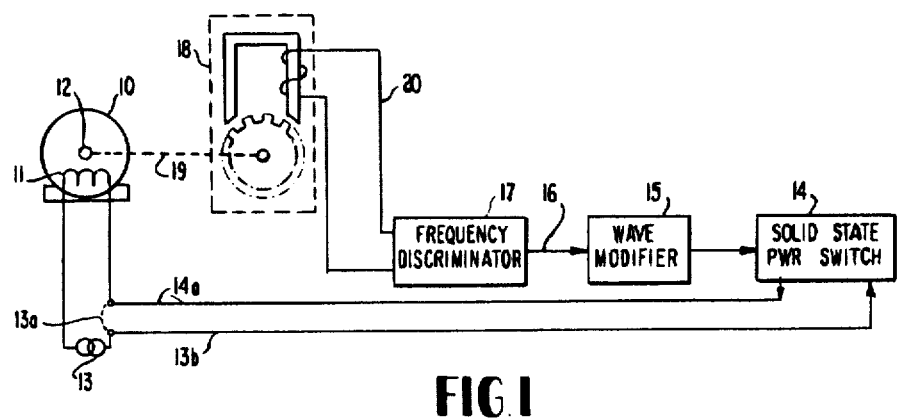
FIG. 1 is a block diagram of a variable field induction motor system constructed in accordance with the present invention.

As shown in FIG. 1, a standard AC induction motor 10 is provided with a stator winding 11, and a rotor having a shaft 12 adapted to be coupled to a load. An AC power source 13 is normally coupled to the stator winding 11, e.g., as shown in broken line 13a, to energize the stator winding thereby to effect rotation of rotor shaft 12. In accordance with the present invention, this normal energization circuit is interrupted, and power source 13, instead of being coupled directly to stator winding 11 is connected instead, as a 13b, to one side of a solid state power switch 14, the other side of which is connected, e.g., as at 14a, to the stator winding 11. Switch 14 may comprise, for example, a Triac assembly, or a silicon controlled rectifier assembly, which is regulated by a wave modifier 15 whose operation is controlled by a DC control voltage appearing on a line 16 at the output of a frequency discriminator 17, which control voltage is a function of the load on motor 10.

More particularly, a small AC generator 18 is mounted, as at 19, on the rotor shaft 12 of induction motor 10 for rotation therewith. Generator 18 generates a high frequency AC signal (about 1800 Hz) whose frequency varies with variations in the speed of rotation of rotor shaft 12. This frequency modulation, i.e., the change in frequency of the AC signal appearing at generator output 20, is a function of the motor slip and therefore of the load on the motor. This AC signal is applied to the input of frequency discriminator 17 to convert the AC signal frequency variations on line 20 to a DC control voltage or signal on line 16 whose magnitude is a function of the frequency modulation of the AC signal at motor speeds above 95% of synchronous speed.

The DC control voltage on line 16 is used to control the operation of wave modifier 15. The various circuits which are included in that wave modifier, and their operation, will be described more fully in reference to FIG. 2. For the present, it suffices to note that the DC control voltage on line 16 is coupled to wave modifier 15 which includes a gate trigger generator operative to produce pulses for a predetermined portion of the time of each cycle from AC power source 13. The duration of the train of pulses produced by said gate trigger generator is a function of the magnitude of the DC control signal on line 16, and therefore, at near synchronous rotor speeds, is a function of the load on motor 10. The train of pulses produced, when they occur, are coupled to the control terminal of solid state power switch 14 to close said switch for a corresponding time portion of each cycle from the AC power source 13. As a result, a greater or smaller portion of each voltage cycle from power source 13 is coupled via connection 14a to stator winding 11 of motor 10, as a function of the load on the motor. When the load increases, therefore, the stator magnetic field density of the motor similarly increases; and, when the load on the motor decreases, the magnetic field density of the stator is decreased.

Figure 2:
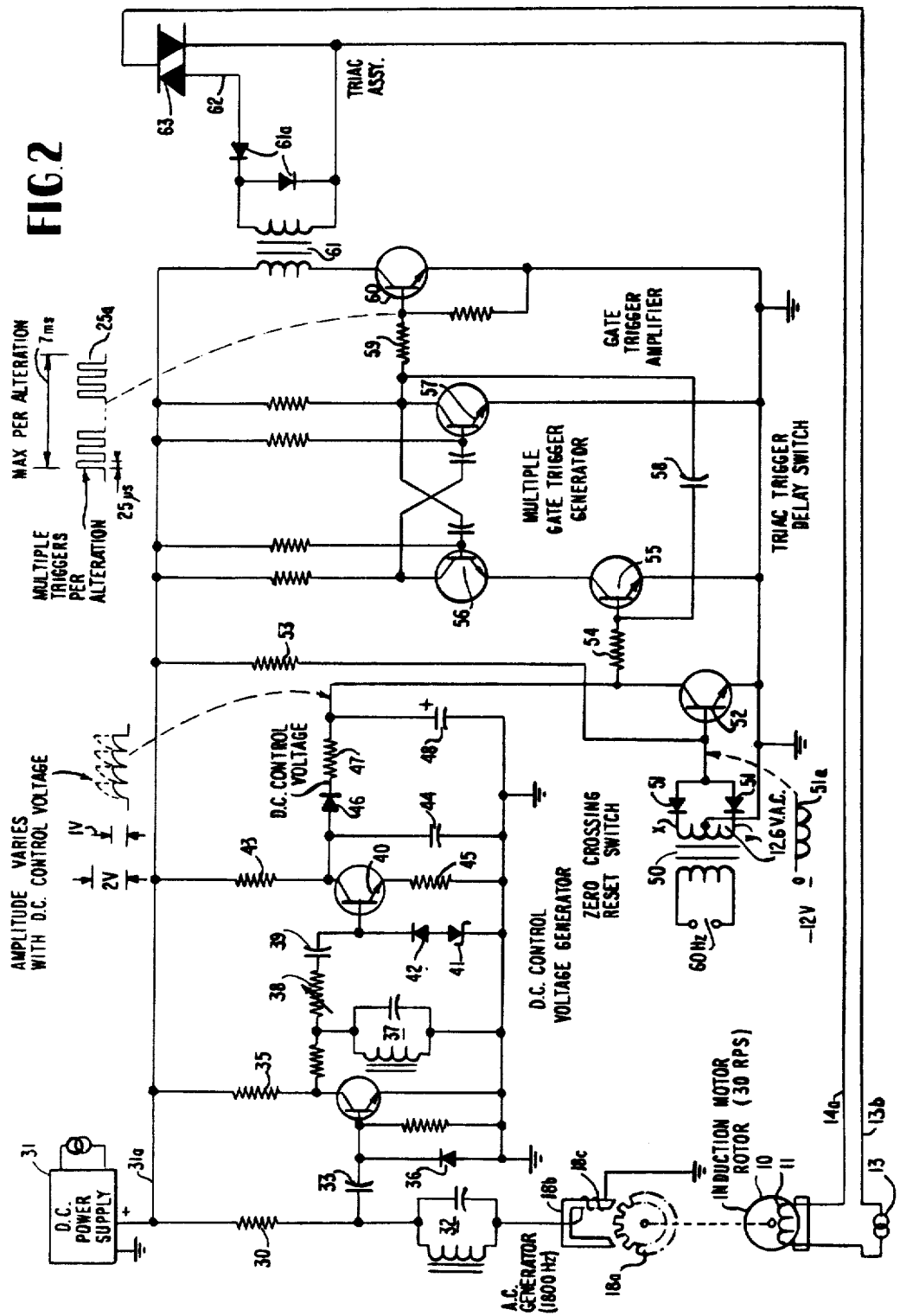
FIG. 2 is a schematic diagram of a preferred circuit of the type shown in block diagrammatic form in FIG. 1.

A preferred circuit operating in the fashion described above is shown in FIG. 2. For purposes of the subsequent description, it is assumed that AC induction motor 11 is a single phase induction motor, and the circuit of FIG. 2 shows how the stator flux density can be controlled as a function of motor load in that single phase. Polyphase motors can be made to operate in similar fashion by using two or more circuits of the type shown in FIG. 2 for the several phases, respectively, of the polyphase motor.

The generator 18 of FIG. 2 comprises a toothed wheel 18a which is mounted at 19 on the shaft of induction motor 10, and cooperates with a stator 18b whose winding 18c is energized through a resistor 30 from the positive side 31a of a DC power supply 31. Toothed wheel 18a and its associated stator comprise a small AC generator whose output frequency modulation is determined by the nature of motor 10, its rotational speed and the number of teeth on wheel 18a. One output frequency of the generator is an integral multiple of the speed of rotation of induction motor 10 and may, for example, be 60 times the RPS of the motor. For purposes of the subsequent description, it will be assumed that the induction motor rotates at a speed of 30 RPS and that the AC output from the small generator connected thereto includes the frequency 1800 Hz., and these parameters will be referred to hereinafter for purposes of illustration. It will be understood however, that structures other than those shown in FIG. 2 can be employed to produce the desired AC output signal, and that the signal frequency may be other than that specified herein.

The output signal from the AC generator 18a-18c is generated across an LC circuit 32 which is broadly resonant at the generator frequency to obtain a more nearly sinusoidal waveform output. The resultant AC signal is applied via capacitor 33 to the base of a transistor 34 whose collector is energized via resistor 35 from the positive side of DC power supply 31. Any amplitude variations of the signal from the AC generator 18a-18c are eliminated by the clamping actions of a diode 36 and the limiter action of the base-emitter junction of transistor 34.

Due to the positive and negative clamping actions, the waveform at the base and collector of transistor 34 becomes a flat top wave. These flat top pulses are fed to and excite a high Q resonant circuit 37 which is tuned above the aforementioned frequency of generator 18a-18c to approximately 1850 Hz. The output signal of the AC generator operates on the slope of the resonance curve of circuit 37, so that said circuit 37 acts, in effect, as a frequency discriminator, i.e., the voltage appearing across circuit 37 varies in amplitude in accordance with the frequency modulation of the signal which is supplied thereto from transistor 34.

The signal developed across resonant circuit 37 is fed through a variable resistor 38 and a capacitor 39 to a signal-biased DC amplifier comprising transistor 40. As the signal derived base voltage rises above its cut-off threshold, there is a rapid, nonlinear turn-on of transistor 40 collector current. The variable resistor 38 is adjusted so that said nonlinear turn-on is referenced to a particular energy-efficient speed above 95% of the motor's synchronous speed, after which transistor 40's conduction becomes gradually more linearly responsive to said signal voltage magnitude. Transistor 40 is biased by a negative charge which is accumulated on capacitor 39. This bias, which is a substantially steady biasing voltage, is created by the passage of alternating current through capacitor 39 and its subsequent rectification by transistor 40. Due to this bias, the load imposed on resonant circuit 37 by transistor 40 is minimal. Zener diode 41, connected between the anode of a diode 42 and ground, provides a low resistance discharge path for capacitor 39 during negative signal alternation peaks that exceed its conduction threshold (Zener) voltage. Diode 42 prevents the positive signal alternation from being conducted to ground through Zener diode 41.

Since the amplitude of the AC voltage across resonant circuit 37 varies due to the varying frequency supplied thereto, the bias on transistor 40 also varies and the portion of the sine wave which is effective to render transistor 40 conductive similarly varies. Above the nonlinear conduction threshold of transistor 40, an increase in the amplitude of the AC voltage across resonant circuit 37 results in an increase in the current flow through resistor 43, which in turn produces a greater voltage drop across resistor 43 and reduces the voltage at the collector of transistor 40, and vice versa. As a result, this particular portion of the circuit operates as an inverse signal generator, i.e., a reversal of amplitude variation occurs between the base and collector of transistor 40. The collector of transistor 40 is connected to one side of a capacitor 44, the other side of which is grounded. Capacitor 44 is charged through resistor 43 part of the time, i.e., when transistor 40 is nonconductive, and is discharged through transistor 40 and resistor 45 when transistor 40 is rendered conductive. The time constant of the RC circuit 43, 44, is long compared to 1800 Hz., (i.e., the nominal output frequency of AC generator 18a–18c) and the ripple voltage across capacitor 44 accordingly has a low amplitude. As a result, the voltage across capacitor 44 is a fairly steady DC potential whose magnitude varies inversely to variations in the magnitude of the voltage across the resonant circuit 37 at motor speeds above 95% of synchronous speed.

The voltage across capacitor 44 comprises the DC control voltage shown in line 16 of FIG. 1. It is supplied through a diode 46 and a resistor 47 to a further capacitor 48, constituting the input to wave modifier 15 previously discussed in reference to FIG. 1. Diode 46 prevents capacitor 44 from receiving any charge from the wave modifier circuit.

A transformer 50 (whose primary winding may, for example, be coupled to a tap on AC power source 13) supplies a low potential (e.g., 12.6 Vac.) 60 cycle voltage to full wave rectifiers 51 connected to its secondary winding. The rectifiers 51 are so poled that their outputs are in the negative direction (e.g., as indicated at 51a) and these negative-going pulses are applied to the base of a transistor 52 comprising a portion of a zero crossing reset switch, i.e., the negative going pulses thus supplied to transistor 52 keep transistor 52 nonconductive for the majority of each cycle, with this condition being altered only during the zero crossings of the 60 cycle wave.

More particularly, the base of transistor 52, in addition to being supplied with the negative going alternations from rectifiers 51, is supplied with forward bias current through a resistor 53 which is connected to the positive side of DC power supply 31. This forward bias current causes collector-emitter saturation in transistor 52 during zero crossings and, during this time, the junction of resistors 47, 54 and capacitor 48 (i.e., the collector of transistor 52) is clamped to the near ground potential of approximately 0.1 vdc. After the AC source voltage passes through zero, the voltage supplied by rectifiers 51 beings falling toward a negative value of approximately −12 vdc. When the resultant voltage on the base of transistor 52 falls below approximately +0.7 vdc., collector-emitter cutoff occurs. Transistor 52 remains cutoff until the voltage at its base again rises to +0.7 vdc. due to the forward bias supplied by resistor 53 and the arrival of the next zero crossing. Thus, transistor 52 is cut off most of the time during each AC power source voltage alternation, and conducts only slightly before, during, and slightly after the zero crossings of those alternations. The duration of conduction of transistor 52 is approximately 1 ms.

When transistor 52 is conductive, capacitor 48 discharges; when transistor 52 is cut off, as described above, capacitor 48 begins charging through resistor 47 toward the level of the DC control voltage which is supplied by capacitor 44. The resultant signal is supplied via resistor 54 to the base of transistor 55 to render transistor 55 conductive, but the conduction of transistor 55 is delayed in accordance with the voltage which is actually present on the positive side of capacitor 48. More particularly, transistor 55 remains nonconductive until the voltage across capacitor 48, which is coupled to the base of transistor 55 through resistor 54, reaches approximately +0.7 vdc., whereafter transistor 55 (which constitutes a trigger delay switch) begins to conduct collector-emitter current.

Transistor 55 is connected to the emitter of a transistor 56, which cooperates with a further transistor 57 and with a plurality of associated capacitors and resistors, to provide an astable (free-running) multivibrator of well-known configuration, with one exception. The exception is that, whereas the emitter of transistor 57 is directly grounded, the emitter of transistor 56 in said multivibrator is not grounded and, instead, is connected to ground through transistor 55. As a result, typical multivibrator operation of transistors 56, 57 is prevented until transistor 55 conducts to provide a conduction path to ground for the emitter of transistor 56. As soon as transistor 55 is brought to saturated conduction, typical astable multivibrator operation occurs. The starting of the multiple gate trigger generator 56, 57 is accelerated by capacitor 58 which feeds the starting pulse from the output of said generator to transistor switch 55.

The component values of the multivibrator (or multiple gate trigger generator) 56, 57 are selected to cause multivibrator action at approximately 20 kHz. The output signal which is produced, when the multiple gate trigger generator is rendered operative, takes the form shown in FIG. 2 at 25a, i.e., a train of trigger pulses each of which has a width in the order of 25 μs, occurring over a maximum time period of 7 ms. per alternation of the AC power source 13, or occurring during such lesser portion of said AC power source cycle as may be determined by the time at which transistor 55 was rendered conductive to enable operation of the multiple gate trigger generator.

After transistor 55 is brought to saturation by the combined action of the forward bias coupled from capacitor 48 and the positive going or forward bias coupled to the base of transistor 55 via capacitor 58 from the output side of the multiple gate trigger generator, transistor 55 is maintained in this state by said combined forward biases for the remainder of the power source voltage alternations. The positive voltage pulses (25a) appearing at the output side of the multiple gate trigger generator are coupled via a resistor 59 to a gate trigger amplifier comprising a transistor 60, an associated transformer 61, and failure mode protection diodes 61a, for conversion to higher power current pulses which, in turn, are supplied to the gate electrode or control terminal 62 of a Triac assembly 63 connected between AC power source 13 and the stator winding 11 of induction motor 10. The protection diodes 61a prevent positive gate current flow and limit reverse gate voltage to approximately 2 v by diode clamping.

Triac assembly 63 is turned on by the arrival of the first pulse in the series of pulses coupled to its gate electrode from the gate trigger amplifier 60. The continuous stream of pulses thereafter supplied to the gate electrode of Triac assembly 63 assures full balance conduction of Triac assembly 63 regardless of voltage transients which may be produced by the varying inductive load of the motor 10 that, otherwise, might create alternation imbalance by self-commutation at times other than the current zero crossings conducted from the AC power source 13.

When the stator 11 of the single phase induction motor 10 is connected to the Triac assembly 63. As shown in the drawings, and power from AC source 13 is applied to said Triac assembly, there will, at first, be no 1800 Hz. output from generator 18a–18c due to the fact that the motor 10 has not yet started to rotate. This results in a maximum positive DC control voltage appearing on line 16 (FIG. 1). This high DC output causes transistor 55 to conduct without delay after each zero crossing, causing the multiple gate trigger generator 56, 57 to commence operation immediately, which in turn causes Triac assembly 63 to start conducting without delay. Since this operation is continuous, the Triac assembly will pass current in both directions, and the stator winding 11 of motor 10 will receive full waves of 60 cycles causing the rotor 12 thereof to commence rotation.

As motor 10 approaches full rotational speed, the aforementioned output frequency of AC generator 18a–18c increases toward the resonant frequency of tuned circuit 37. Above about 95% of synchronous speed, transistor 40 operates to reduce the DC control voltage which is produced across capacitor 44, with the result that capacitor 48 does not have sufficient time to receive a full charge before it is discharged periodically by transistor 52. Consequently, the voltage across capacitor 48 is not sufficiently high at the beginning of the charge to immediately reach the conduction threshold of transistor 55, and to start operation of multiple gate trigger generator 56, 57. The result is that Triac assembly 63 does not start conduction at the beginning of the voltage cycle from AC power source 13, but begins conduction later, i.e., at a time subsequent to the commencement of the sine wave voltage cycle from power source 13. Assembly 63 breaks off conduction when the current through it reverses. This occurs slightly after the voltage wave passes through zero, due to the inductance of the stator winding 11 delaying the current wave. The energy which is actually delivered to the motor stator by Triac assembly 63 accordingly represents only part of the sine wave from AC power source 13.

As the motor load increases, the slip of the motor 10 increases and its speed drops; and this reduces the aforementioned frequency of AC generator 18a–18c which, in turn, results in an increase of the DC control potential charging capacitor 48, enabling transistor 55 to reach its conduction threshold sooner and starting the operation of the Triac assembly 63 nearer the beginning of the power cycle, permitting more power to reach the stator of motor 10. In actual operation or a four-pole, 60 Hz, 1 HP motor, the full sine wave is applied to the stator at all motor speeds below about 1750 RPM. When the load on the motor decreases, the slip of the motor decreases and its speed increases; and this increases the said output frequency of AC generator 18a–18c which, as a result of the operations described above, decreases the operative angle of the AC wave and decreases the power which is supplied to the motor.

Figure 3:
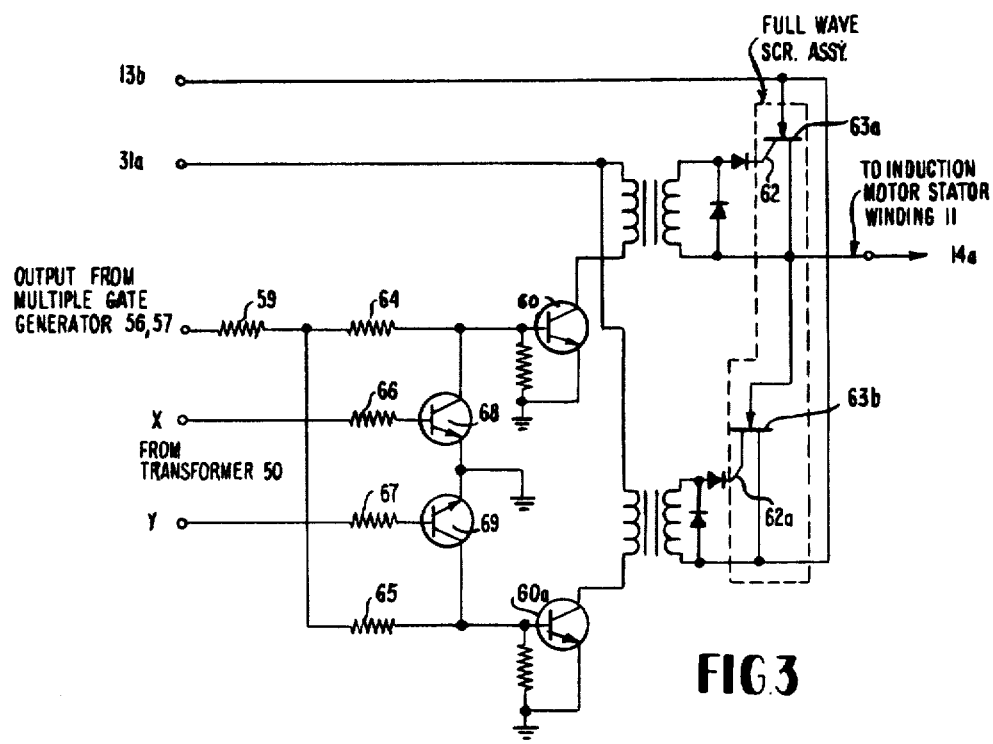
FIG. 3 is a schematic diagram of an alternative form of the invention.

In the case of very large motors it is preferable to use a pair of silicon controlled rectifiers (SCRs) as the power switch, in place of a Triac assembly, due to the power limitations of Triacs. FIG. 3 diagrammatically illustrates a preferred circuit incorporating this modification.

FIG. 3 is assumed to include everything preceding transformer 61 shown on FIG. 2. In the modified circuit, however, the Triac assembly 63 is replaced by a pair of SCRs 63a and 63b, whose gate electrodes 62, 62a respectively are individually energized from a pair of gate trigger amplifiers 60, 60a connected as shown. This change is necessitated by the fact that, when a Triac assembly is used, control pulses may be applied to the gate electrode of the assembly at any time without regard to the instantaneous polarity of the power source which is then being applied to the Triac assembly, since the applied control pulses will initiate conduction of the assembly through one or the other half thereof in dependence upon the then prevailing polarity of the power source. However, when a silicon controlled rectifier is used as a solid state power switch, such control pulses would damage the SCR if they were supplied to the SCR gate electrode when the power wave applied to its anode is of negative polarity, i.e., when current is being blocked by the SCR. Consequently, provision must be made to send controlling pulses to the SCR only when the SCR should conduct current. This may be done, as shown in FIG. 3, by having the controlling pulses for the two SCRs amplified by separate transistors 60, 60a for each half of the power wave respectively, and by shutting off these two transistors alternately during the times that their respective SCRs 63a and 63b are blocking the passage of current to the motor stator winding.

In the circuit of FIG. 3, this operation is accomplished as follows: The pulse output from multiple gate trigger generator 56, 57 is coupled through resistor 59, as in FIG. 2, but is then supplied to a pair of isolating resistors 64 and 65 which serve as inputs to the two gate trigger amplifier transistors 60 and 60a respectively. A further pair of resistors 66, 67 are connected respectively to points x, y on the secondary of transformer 50 (see FIG. 2), and the AC voltage from the secondary of transformer 50 is coupled through said resistors 66 and 67 to the bases of a pair of transistors 68 and 69 respectively to cause gate trigger amplifier transistors 60 and 60a to be alternately inhibited. More specifically, conduction of transistor 68 clamps the base of transistor 60 to ground, thereby preventing trigger pulses from appearing at the gate electrode 62 of SCR 63a during negative AC power source alternations. Likewise, conduction of transistor 69 clamps the base of transistor 60a to ground, to prevent trigger pulses from appearing at gate electrode 62a of SCR 63b during positive AC power source alternations. Thus, SCRs 63a and 63b are less prone to failure because they only receive gate trigger pulses when their anodes are positive with respect to their cathodes.

While we have thus described preferred embodiments of the present invention, many variations will be apparent to those skilled in the art. By way of example, various means other than a DC amplifier can be used to increase the voltage supplied by the motor load detecting means, in which event a rectifier can be used in place of transistor 40. It must therefore be understood that the foregoing description is intended to be illustrative only and not limitative of the present invention, and all such variations and modifications as are in accordance with the principles described are meant to fall within the scope of the appended claims.

Having thus described our invention, we claim:

1. An AC voltage wave modifier for use in a system of the type comprising an AC power source and an AC load to control the energization of said AC load from said AC power source, said wave modifier comprising controllable AC power switching means having a control terminal for controlling the conductivity of said power switching means, said AC power switching means being connected between said AC power source and said AC load; means for providing an AC reference signal; a multiple trigger pulse generator synchronized to said AC reference signal and operative selectively to produce a continuous train of short duration, rapid rise-time voltage pulses during each cycle of said AC reference signal; means for providing a DC control voltage; means responsive to the amplitude of said DC control voltage for controlling the starting of said multiple trigger pulse generator; means responsive to voltage zero crossings of AC reference signal and operative to terminate said continuous train of trigger pulses from said multiple trigger pulse generator at each of said zero crossings, said last-named means including rectifier means rendered conductive after each of said voltage zero crossings by the increasing voltage of each alternation of said reference signal and rendered nonconductive before each of said voltage zero crossings by the decreasing voltage of each of said alternations, said rectifier means comprising a transistor, a full wave diode assembly energized by said reference signal and having an output connected to the base of said transistor, and a forward bias voltage source also connected to the base of said transistor, whereby said diode assembly, when conducting, provides a reverse bias voltage opposing said forward bias and operative to keep said transistor cut off until shortly before, during and slightly after said voltage zero crossings of said AC reference signal, and switch means coupled to said transistor and to said multiple trigger pulse generator for turning said multiple trigger pulse generator off and on in accordance with the conductive or nonconductive state of said transistor, whereby said multiple trigger pulse generator produces a plurality of voltage pulses for each cycle of said AC reference signal with the number of said pulses produced being a joint function of the amplitude of said DC control voltage and the frequency of said AC reference signal; and means coupled to the output of said multiple trigger pulse generator for transforming said train of voltage to a continuous stream of current pulses and for coupling said stream of current pulses to said control terminal of said controllable AC power switching means thereby to cause said power switching means to be rendered conductive for a time duration, during each cycle of said AC reference signal, which is a joint function of the amplitude of said DC control voltage and the frequency of said AC reference signal.

2. The wave modifier of claim 1 wherein said AC power switching means includes a Triac assembly having its input coupled to said AC power source and its output coupled to said AC load.

3. The wave modifier of claim 1 including capacitor means coupling the output of said multiple trigger pulse generator to said switch means to accelerate the turning on and off and pulse switching of said multiple trigger pulse generator thereby to decrease the rise and fall times of each voltage pulse in said train of pulses.

4. The wave modifier of claim 1 including means for deriving said AC reference signal from said AC power source.

5. The wave modifier of claim 1 wherein said DC control voltage has a variable amplitude and said AC reference signal has a fixed frequency.

6. The wave modifier of claim 1 including means for deriving said AC reference signal from said AC power source, said AC power switching means comprising a full wave SCR assembly, and a pair of gate trigger inhibit means responsive to alternations of said power source and operative to enable individual triggering of the SCRs in said full wave assembly only when the anode of each SCR to be triggered is positive with respect to the cathode of said SCR.

* * * * *